United States Patent [19]

Reedy

[11] 4,121,614
[45] Oct. 24, 1978

[54] VALVE GUARD FOR BOTTOM OPERATED TANK CAR VALVE

[75] Inventor: Charles E. Reedy, Bridgeton, Mo.

[73] Assignee: ACF Industries, Incorporated, New York, N.Y.

[21] Appl. No.: 776,450

[22] Filed: Mar. 10, 1977

[51] Int. Cl.² .................. F16K 27/03; F16K 27/08
[52] U.S. Cl. ............................. 137/382.5; 251/144
[58] Field of Search ............... 251/144, 148, 152; 137/382.5, 321, 797

[56] References Cited

U.S. PATENT DOCUMENTS

| | | | |
|---|---|---|---|
| 1,278,813 | 9/1918 | Weaver | 251/144 |
| 1,534,139 | 4/1925 | Ostrander | 251/144 X |
| 2,092,926 | 9/1937 | Lithgow | 251/144 X |
| 3,981,481 | 9/1976 | Reedy et al. | 137/797 |

*Primary Examiner*—William R. Cline
*Attorney, Agent, or Firm*—Henry W. Cummings

[57] ABSTRACT

In a bottom operable railway tank car valve assembly, a valve closure is movable between open and closed positions relative to an opening in a valve body mounted in the tank bottom for loading or unloading the lading. An operator depends from the valve closure. The lower end is contoured to receive a tool for opening and closing the valve closure. A valve guard is attached to the valve body with mechanical fasteners which constitute a shear plane. The valve guard includes a hollow depending portion. A valve guard cap is attached to the depending portion. The valve guard cap includes a depending protrusion which extends below the depending portion, and a transverse portion which extends below, and is spaced from, the bottom of the valve operator. If the valve guard or the valve guard cap is impacted, the loads are transmitted up through the valve guard to the valve body. Horizontal loads may cause the valve guard to shear off along the shear plane. Vertical loads are transmitted into the relatively massive tank shell. However, little, if any impact force is transmitted to the valve operator or the valve closure located within the valve body. For loading and unloading the valve guard cap is removed, and an adapter is attached to the valve guard, the adapter including a tool for raising and lowering the valve closure.

7 Claims, 8 Drawing Figures

VALVE GUARD FOR BOTTOM OPERATED TANK CAR VALVE

BACKGROUND OF THE INVENTION

In U.S. Pat. No. 3,981,481 granted Sept. 21, 1976, assigned to the same assignee as the present application, a bottom operable tank car valve is disclosed including a valve body attached to an opening in the bottom of the tank. The valve body includes an opening centrally thereof for loading and unloading the lading. A depending housing is attached to the valve body with mechanical fasteners which constitute a shear plane. The housing includes a loading and unloading spout extending radially outwardly from the outlet. An operating assembly for loading and unloading the tank is mounted within a bore in the lower portion of the housing. The operating assembly includes a lower operator which extends below the valve housing and which is adapted to be engaged by a suitable unloading tool. The lower operator has a square opening engaging with clearance a square head on an upper valve operator which extends upwardly within the opening in the valve body. A retainer assembly attached to the valve body maintains the upper operator vertically fixed and spaced from the walls of the valve body. The upper operator engages a depending member from a valve closure. The closure is movable between a closed position engaging the top surface of the retainer assembly, and an open position to load or unload the lading.

In accordance with one embodiment in the '481 patent the upper operator engaging the depending valve closure is located within the valve body at a point above the shear plane defined by the mechanical fasteners holding the housing in engagement with the valve body (FIGS. 10 and 11 of the '481 patent). Thus in the event of impact to the depending housing, the housing will shear off along the shear plane provided in the mechanical fasteners, and the lower operator will drop off, leaving in place the upper operator within the valve body. After such an impact the car can be unloaded by attaching a suitable tool to the head on the upper operator to raise the valve closure and unload the car.

While this arrangement is considered to be highly advantageous in protecting the car against impacts bursting the tank, it does have some disadvantages. If in transit or during derailment the lower portion of the valve housing is impacted, some of the impact force is transmitted to the lower operator, and then upwardly into the upper valve operator. This force may result in damage to the upper operator such as deforming and rendering inoperative the threads for moving the valve closure vertically, or forcing the upper operator upwardly and moving the valve closure out of the closed position, causing lading to come out of the tank. This problem is more serious if the operator neglects to replace a removable cap on the valve housing, which provides some protection against impacts to the lower housing and/or operating assembly being transmitted up into the second operator and valve plug.

Thus it would be desirable to provide a bottom operable loading and unloading valve assembly in which impacts to the lower portion of the housing and valve assembly are less readily transmitted vertically up into the upper operator and into the valve plug.

If the operating assembly for opening the valve is damaged in transit, expensive operator time is required at the unloading site to repair the outlet prior to its unloading. This results in reduced unloading rates and may require the car be taken out of service for repairs.

Furthermore, the depending valve housing is a heavy and expensive member, usually a casting. If this housing could be eliminated, or made smaller, considerable cost and weight savings in the tank car valve assembly would be obtained. Also, the size and weight of this housing makes disassembly and removal of the housing awkward for the operator.

Usually the spout for unloading on the housing extends radially outwardly from the outlet only in one direction. This requires that the unloading operator move the unloading hose and connection adapter so as to engage the unloading spout in the position that the spout is located when the car arrives at destination. Since the unloading hose is often heavy and often includes little surplus length, this can be a difficult operation, and may require relocation of the tank car.

The present housing requires that the unloading hose be attached with a threaded connection. Threads are provided on the housing for attaching the unloading hose and for attaching a removable cap which is applied over the loading and unloading spout. Some receivers prefer to attach the unloading hose to the internal threads where the unloading plug is attached and where the tube for heating congealed lading is usually attached (element 104, FIG. 1 of the '481 patent). In either case attachment of the unloading hose to a threaded fitting may require the cost of the expensive plummer time in some locations to make this connection. Thus a quick-connect-disconnect connection would be more desirable than the threaded connections presently provided on the housing.

SUMMARY OF THE INVENTION

In accordance with the present invention the depending valve housing which was previously a part of the bottom operable tank valve assembly is replaced with a depending valve guard assembly which is attached to the valve body with mechanical fasteners having a shear plane. The valve guard assembly includes a valve guard having a depending portion which extends below the valve body and below the upper valve operator located within the valve body. The valve guard depending portion includes an opening which receives a removable valve guard cap. The valve guard cap includes a depending protrusion which extends downwardly, below the bottom of the valve guard, and a transverse portion which extends below and is vertically spaced from the lower end of the upper operator. If the valve guard or the valve guard cap is impacted, the impact forces are transmitted vertically up through the valve guard and into the valve body. The valve body is relatively massive and can withstand the vertical component of such impacts. Impact forces with large horizontal components may cause the valve guard assembly to shear off along the shear plane in the mechanical fasteners holding the valve guard attached to the valve body. With this arrangement little, if any, impact force is transmitted to the upper valve operator located within the valve body. The valve guard cap further includes a cap opening centrally thereof into which a valve guard plug is removably inserted. The valve guard plug may be removed and a tool of smaller cross section than the plug opening may be inserted through this opening which engages the upper valve operator to check that the valve closure has been tightened into closed position, or to unload the lading in an emergency. The valve guard plug is protected from impacts by the depending protrusion so that in an emergency it is unlikely that the plug cannot be removed quickly to unload the lading. The external surface of the valve guard includes a concave connection contour which is adapted to receive a quickly connectable loading and unloading valve adapter at loading and unloading sites.

THE DRAWINGS

FIG. 1 is a sectional view of one embodiment of the bottom operable loading and unloading valve disclosed in U.S. Pat. No. 3,981,481;

DESCRIPTION OF PRIOR ART

Figure 1:
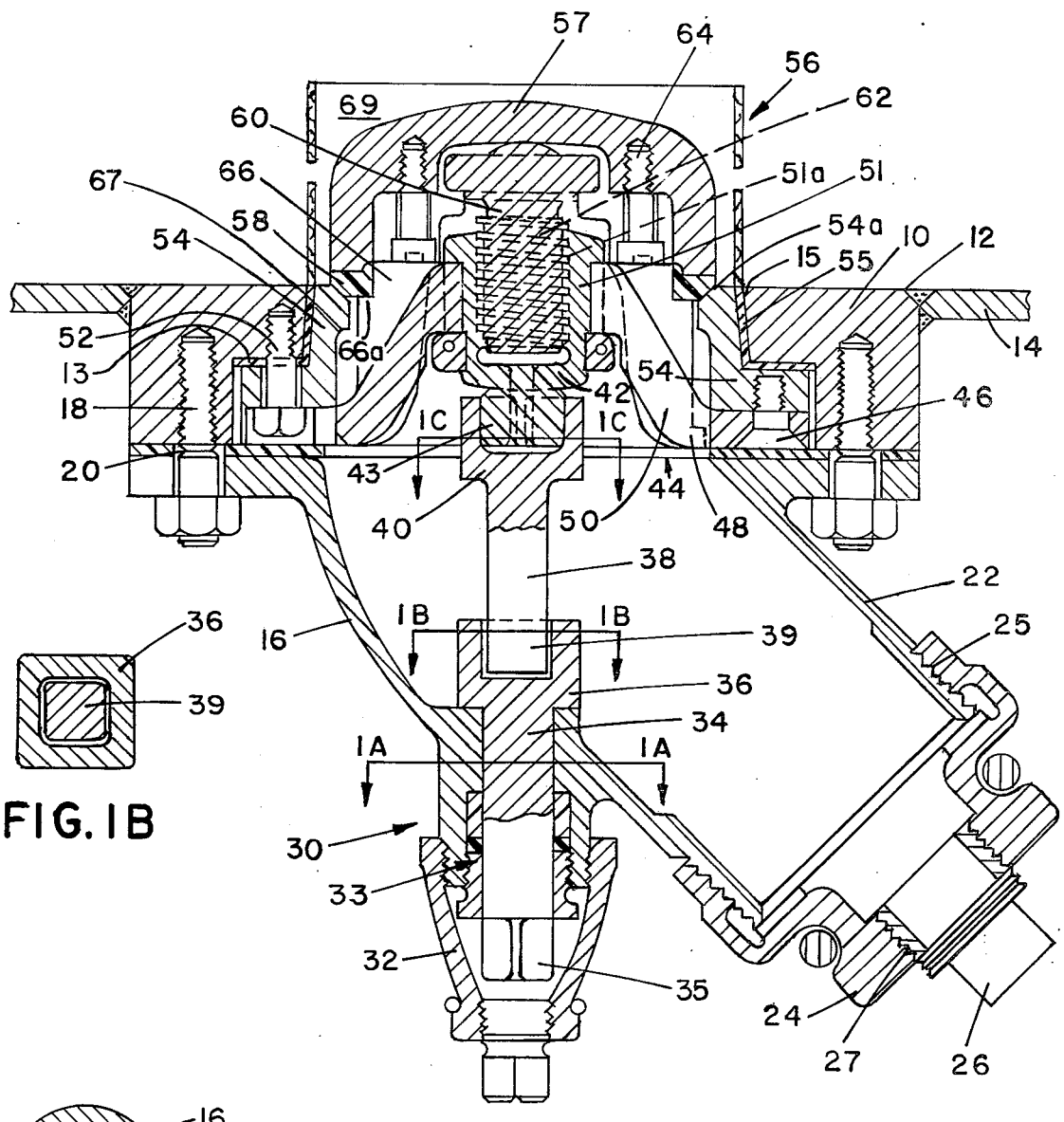
FIG. 1A is a sectional view looking in the direction of the arrows along the line 1A—1A in FIG. 1.
FIG. 1B is a sectional view looking in the direction of the arrows along the line 1B—1B in FIG. 1.
FIG. 1C is a sectional view looking in the direction of the arrows along the line 1C—1C in FIG. 1.
Figure 1:
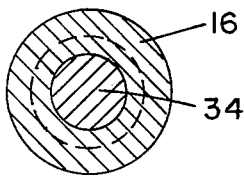
Figure 1:
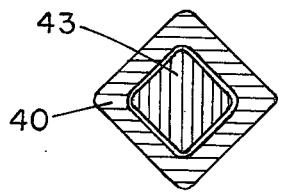

The bottom operable outlet valve assembly illustrated in FIG. 1 of the drawings is described in U.S. Pat. No. 3,981,481 assigned to the same assignee as the present application and reference is made thereto for a detailed description of this prior art valve assembly. It is sufficient for an understanding of the present invention to point out that this outlet valve includes a valve body 10 which is welded within an opening 12 in the bottom of a tank 14. Valve body 10 is provided with an opening 15 centrally thereof. A depending housing 16 is attached to the valve body 10 with mechanical fasteners 18 containing a shear plane 20. The housing includes a loading and unloading spout 22 including a cap 24, which is attached to threaded fittings 25. In transit a plug 26 is inserted into threaded opening 27 in cap 24. At destination this cap is removed to determine if there has been leakage of the lading in transit. A tube for heating congealed lading may also be attached at this point. The lading is usually unloaded through a hose attached to threads 25. However, occasionally plug 26 is removed and a smaller hose is attached to threads 27.

A lower valve operator assembly 30 is mounted within housing 16 including a removable cap 32. A vertically extending first operator 33 includes a circular body portion 34 (FIG. 1A), a lower tool connection portion 35, and an upper connection portion 36 of square cross section which engages a second operator 38 having a smaller square cross section 39 (FIG. 1B). Second operator 38 has an upper portion 40 also of square cross section which engages an upper operator 42 having a depending connection portion 43 of smaller square cross section than portion 40 of operator 38 (FIG. 1C).

A retainer assembly 44 is mounted within opening 15 in valve body 10. Second mechanical fasteners 46 maintain a first retainer portion 48 in place within valve body opening 10 and attached to second retainer portion 54. First retainer portion 48 includes inwardly and upwardly extending radially spaced arms 50 which engage an upper extension 51 of upper operator 42 and maintain upper operator 42 spaced from the walls of valve body 10. Third mechanical fasteners 52 maintain second retainer portion 54 in engagement with a seal 55 which engages horizontal surface 13 of valve body 10.

A valve closure assembly 56 includes a valve closure 57 having a depending seal 58. Closure 57 is movable vertically between a closed position engaging the upper surface 54a of second retainer portion 54 and an open position allowing loading and unloading of the lading through spout 22.

Valve closure 57 has a depending member 60 which is threaded at 62 and engages a threaced portion 51a of extension 51 of upper valve operator 42. Fasteners 64 hold in place guides 66 depending from closure 56 which holds in place seal 58 and 66a and moves within the space between retainer arms 50. Guides 66 engage catch 67 on second retainer portion 54 to limit vertical movement of closure 57 in the open position. If desired, second retainer portion 54 may also hold in place a screen 69 to prevent objects in the tank from contacting valve closure 57.

It will be apparent that when cap 32 is removed and a suitable tool is applied to the connecting portion 34, the operators 34, 38, and 42 will rotate and the threads 51a of operator 42 will engage threads 62 of depending closure member 60 and move closure 57 up or down, depending upon the direction of rotation.

As mentioned above, this bottom operable valve is advantageous in that in the event that the housing 16 is impacted the housing will shear off along the shear plane 20 and the lower valve operators 34 and 38 will drop off below upper operator 42. Thus after such impact, upper operator 42, retainer assembly 44 and valve closure assembly 56 will remain in place. The car can be unloaded by a suitable tool engaging the connecting portion 43 of upper operator 42. Furthermore, first retainer portion 48 can be disassembled by removing fasteners 46 with lading in the tank.

However, this assembly is disadvantageous in that if the lower portion of the housing is impacted, a component of this impact is transmitted upwardly through lower valve operator assembly 30 and into upper operator 42 and cooperating threads 51a and 62. As a result of such impacts, these threads thus can bind up and make unloading of the outlet difficult at destination.

Furthermore such impacts, if severe enough, not only may damage threads 51a and 62 but also may cause vertical movement of valve closure 57 and leaking or spilling of the lading. Thus including the lower valve operator assembly 30 which can apply impact loads to upper operator 42 in transit is undesirable.

Furthermore, the valve housing 16 is a large heavy member, usually a casting. It is necessarily heavy to withstand the rigors of over-the-rail handling of the tank car. If this heavy housing could be eliminated or reduced to light weight, a significant weight reduction in the car would result.

Also, unloading spout 22 extends in only one direction at destination. Thus the unloading operator must connect onto this spout 22 with a heavy hose having a threaded fitting to attach to threads 25. Occasionally the hose is short making this connection particularly difficult. Some receivers desire to remove plug 26 and attach a smaller diameter threaded fitting to threads 27. However, in either case, connection of the unloading hose involves the attachment of a threaded fitting, which at some locations involves the use of plummer's labor rates at the unloading site, which is expensive.

DESCRIPTION OF THE PRESENT INVENTION

Figure 2:
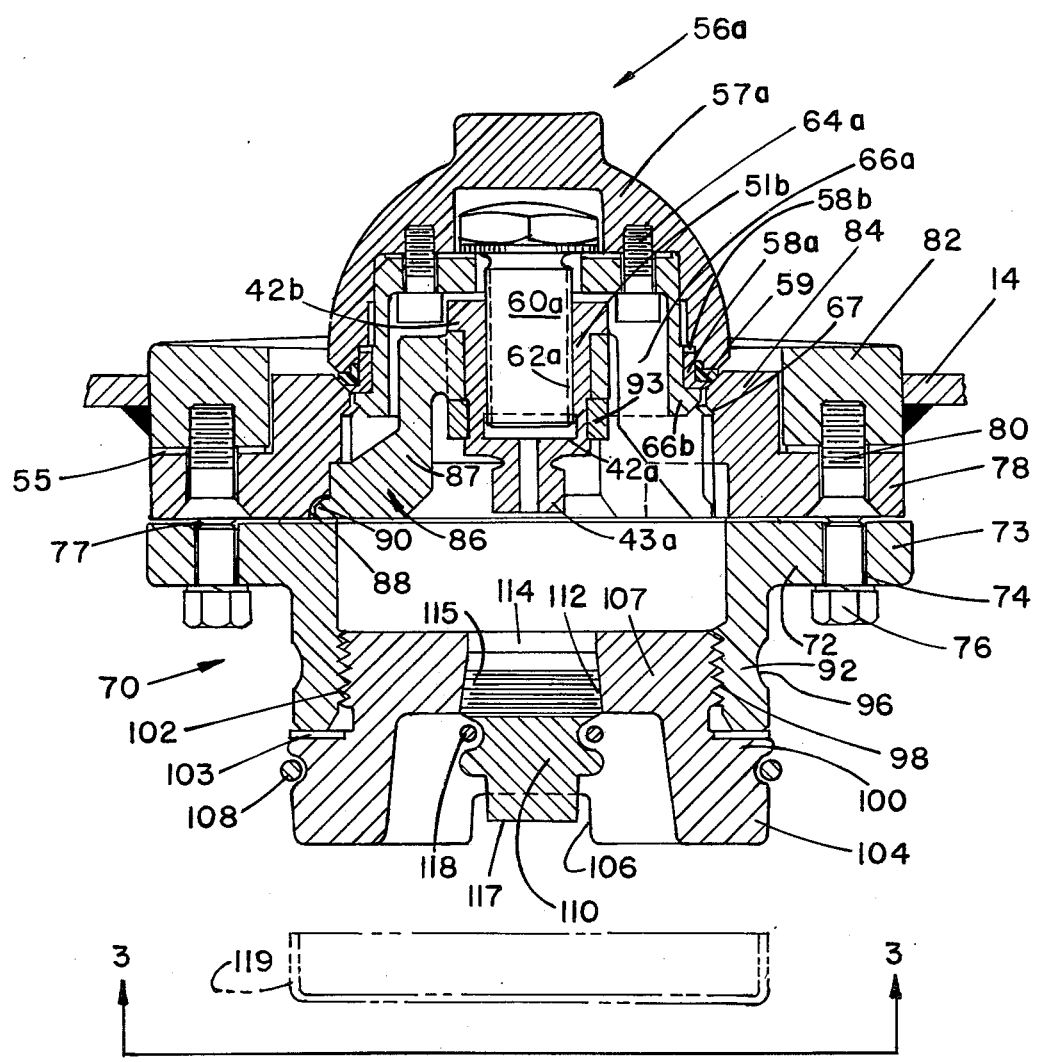
FIG. 2 is a sectional view looking in the direction of the arrows along the line 2—2 in FIG. 3 of a bottom operable outlet valve assembly of the present invention illustrating the valve guard and guard cap.

In accordance with the present invention, the valve housing 16 shown in FIG. 1 is eliminated and is replaced with a valve guard assembly 70 shown in FIG. 2. Valve guard assembly 70 includes a valve guard 72 having a flange portion 73 including openings therein 74 through which fasteners 76 pass to hold the valve guard in engagement with valve body 78. Fasteners 76 include a shear groove 77. Valve body 78 may be welded to the tank as shown in FIG. 1 at 12 or may be attached with fasteners 80 circumferentially spaced from fasteners 76 (FIG. 3) to a universal flange 82 which is welded to tank 14. In the arrangement shown in FIG. 2, closure assembly 56a including valve closure 57a seats on the upper end 84 of valve body 78. Retainer 86 includes radial arms 87 held in place with slots 88 in the valve body and projections 90 on the inner end of retainer 86. Retainer 86 engages upper portion 42b of upper operator 42a and split collar 93 is hold upper operator 42a in place. Valve closure depending member 66b held in place with fasteners 64a maintains seal retainer 58a and elastomeric seal 59a in place at 66c. If elastomeric seal should soften due to high temperature in the tank, the lading weight will force closure 57a and retainer 58a into sealing engagement with valve seat 84. Clearance for this downward movement is provided at 58b. Depending member 66a moves between retainer radial arms 87 as in FIG. 1 as the valve closure is moved between open and closed position. The valve closure is raised and lowered by upper operator 42a in the same way as described in regard to FIG. 1. Threads 51b engage threads 62a in depending operator 60a, as upper operator 42a is rotated.

Valve guard 72 further includes a depending portion 92 having a concave contour 96 which is adapted to be engaged by a loading or unloading adapter to be described hereafter.

Figure 3:
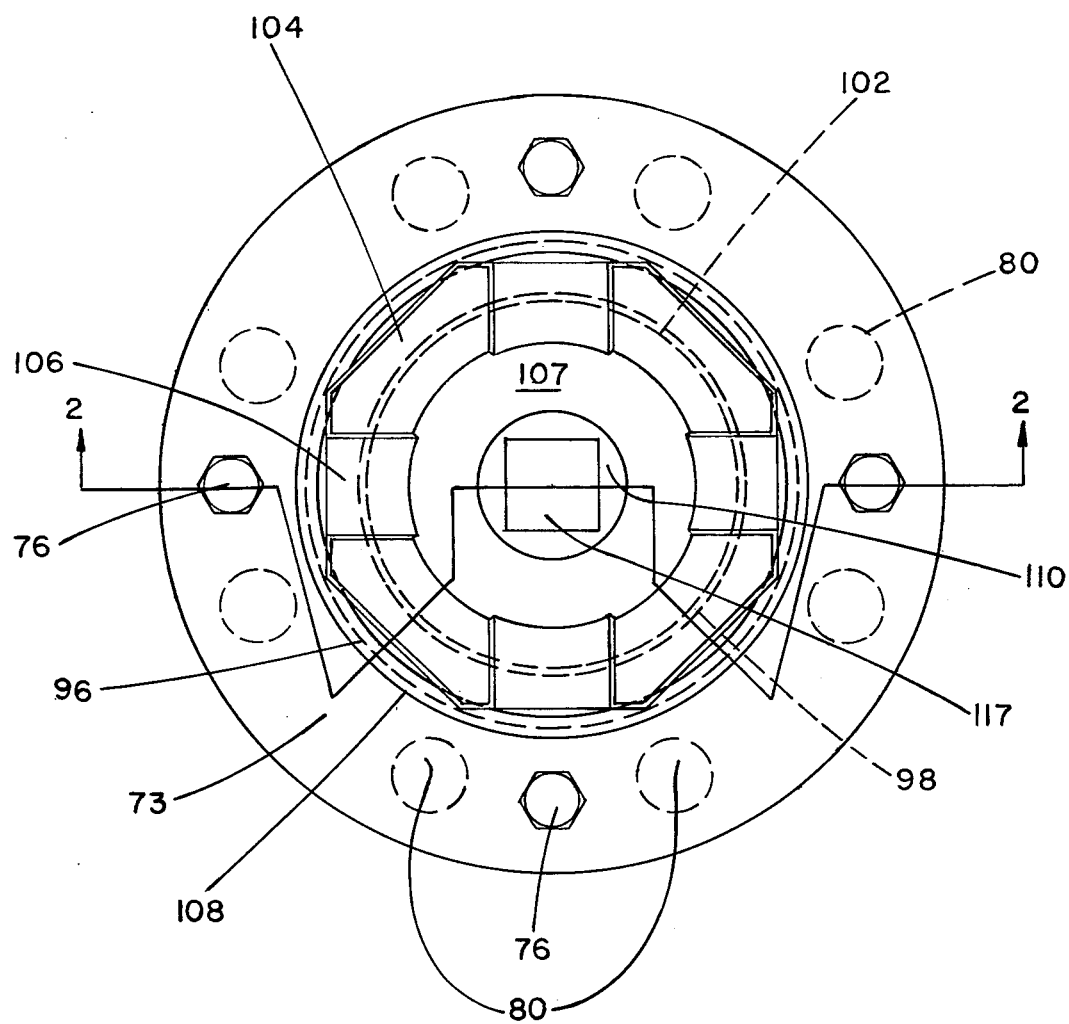
FIG. 3 is a bottom view looking in the direction of the arrows along the line 3—3 in FIG. 2 with the receptacle removed.

Depending portion 92 is internally threaded at 98 and is adapted to receive a valve guard can 100. Cap 100 includes cooperating threads 102, and has mounted thereon a sealing gasket 103. Cap 100 further includes a lower circumferential protrusion 104 which is slotted at 106 (FIG. 3). A transverse portion 107 of cap 100 extends below, but vertically spaced from, upper operator connection portion 43. A chain 108 may be provided to maintain valve guard cap 100 from getting lost or misplaced when it is removed; chain 108 may be attached to a suitable point (not shown) on the outlet.

A valve guard plug 110 having threads 112 is adapted to be removably inserted within cap opening 114 having plug threads 115. Plug 110 includes a square connection portion 117 (FIG. 3). Plug 110 has a chain 118 attached thereto for safe keeping. For U.S. operation, valve guard 72 and valve guard plug 110 are sized to extend below the tank car a distance not exceeding 6 inches as required by the Association of American Railroads.

In operation, if the guard assembly 70 is impacted, this will generally occur at some point on circumferential protrusion 104. Thus the impact forces will be transmitted upwardly from protrusion 104 through valve guard depending portion 96. The vertical component of the impact force applied to the valve guard is applied to the valve body 78 and universal flange 82 which are relatively massive and can withstand such vertical impacts, and then into the massive tank 14. Impact forces with large horizontal components will cause the valve guard assembly 70 to shear off along the shear plane 77 in mechanical fasteners 76.

Note that connection portion 43a of valve operator 42a is vertically spaced from cap transverse portion 107, and is spaced inwardly from the walls of valve body 78. Thus with this arrangement little, if any, impact force is transmitted to the valve operator 42a. Thus it is much less likely that the upper operating assembly or valve closure 57a will be damaged due to impact than with the valve housing 16 of U.S. Pat. No. 3,981,481 with its lower operating assembly in position to transmit impact forces vertically into the operator and/or valve closure.

Valve guard plug 110 may be removed and a tool of smaller cross section than the valve cap opening 114 may be inserted which engages the valve operator connection portion 43a to check for leakage or to determine if the valve closure 57a has been tightened into closed position. A lading receptable 119 may be used to collect lading which may have leaked in transit. If there has been little or no leakage, plug 110 may be removed and cap 100 removed by passing a bar through slots 106 for rotation. A tool engaging portion 43a can be used to unload the lading in an emergency, without taking the time to remove cap 100 if time is critical. Opening 114 is sized to provide clearance between the walls of the opening and a tool passing through the opening so that the lading can be unloaded through opening 114.

Furthermore if impact is to occur, it is most likely that impact will occur on depending protrusion 104 rather than on plug 110 because protrusion 104 extends below and protects plug 110 from such impacts. Thus it is unlikely that plug 110 or cooperating threads 112 and 115 would be damaged by impact. Thus in an emergency situation it is very unlikely that difficulty would occur in removing plug 110 to unload the lading through opening 114 in an occasion when unloading the lading quickly was essential.

Figure 4:
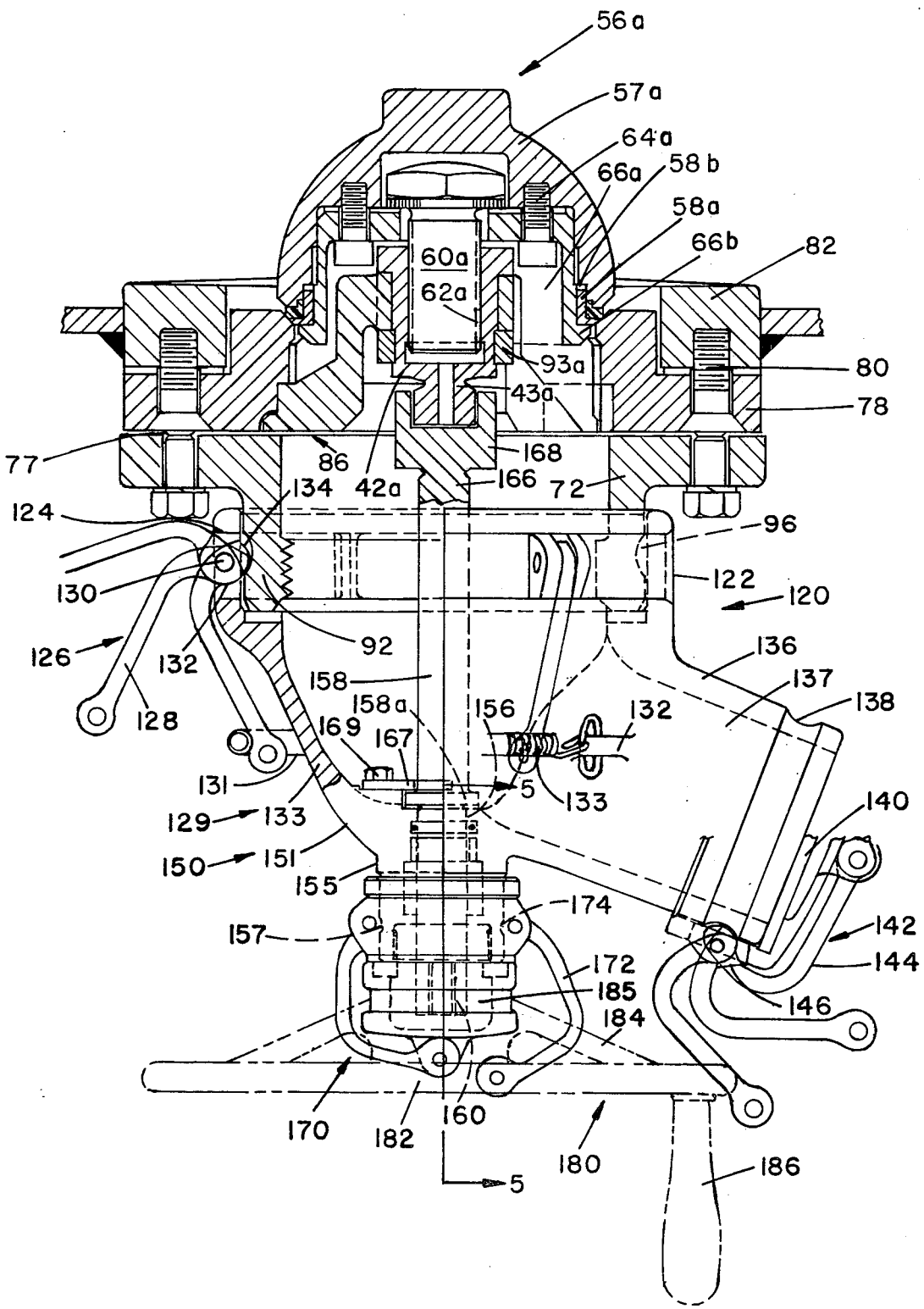
FIG. 4 is a sectional view of a loading and unloading adapter which may be used with the valve guard of the present invention, and illustrating an operating tool for the adapter in phantom.

Referring now to FIG. 4 an adapter 120 is provided for loading and unloading the tank. Adapter 120 includes a quick connect-disconnect portion 112 adapted to engage the depending portion 92 of the valve guard 72. Adapter quick connect-disconnect portion 122 is preferably cylindrical and is provided with circumferentially spaced slots 124 having mounted therein quick connect-disconnect locking devices 126. Locking devices 126 may include an arm 128 mounted about a pin 130 attached to quick connect-disconnect portion 122. Arm 128 includes a locking portion 132 having an overcenter contour 134 adapted to engage concave contour 96 of valve guard depending portion 92. Preferably a plurality of such locking devices 126 are provided about the periphery of cylindrical portion 122.

Arms 128 are maintained in the closed position by means of a spring arrangement 129 including a circumferential tube 131 having a spring attached thereto 133 which is attached to the adapter body portion 132 at any convenient point. To remove arms 128 from the position shown in FIG. 4 the operator moves the tube 131 relative to the arm 128 to free the arms for movement out of the overcenter positon.

Adapter 120 also includes a loading and unloading spout 136. Spout 136 is preferably cylindrical and extends radially outwardly and downwardly from quick connect-disconnect portion 122. Spout 136 includes a discharge opening 137 and a concave contour 138 near the end thereof which is adapted to receive a removable cap 140. Cap 140 preferably includes a quick connect-disconnect device 142 similar to locking device 126 including arms 144 and an overcenter contour 146 which engages concave contour 138 of spout 136.

It will be noted that when adapter 120 is attached to valve guard 72, the spout 136 may be so placed as to be convenient for the operator to attach a loading or unloading hose. The unloading hose may be attached with a quick connect lock on the hose coupling (not shown) to concave contour 138, and thus avoid the use of a threaded fitting and the necessity of having a plummer make this connection at some loading and unloading sites.

Figure 5:
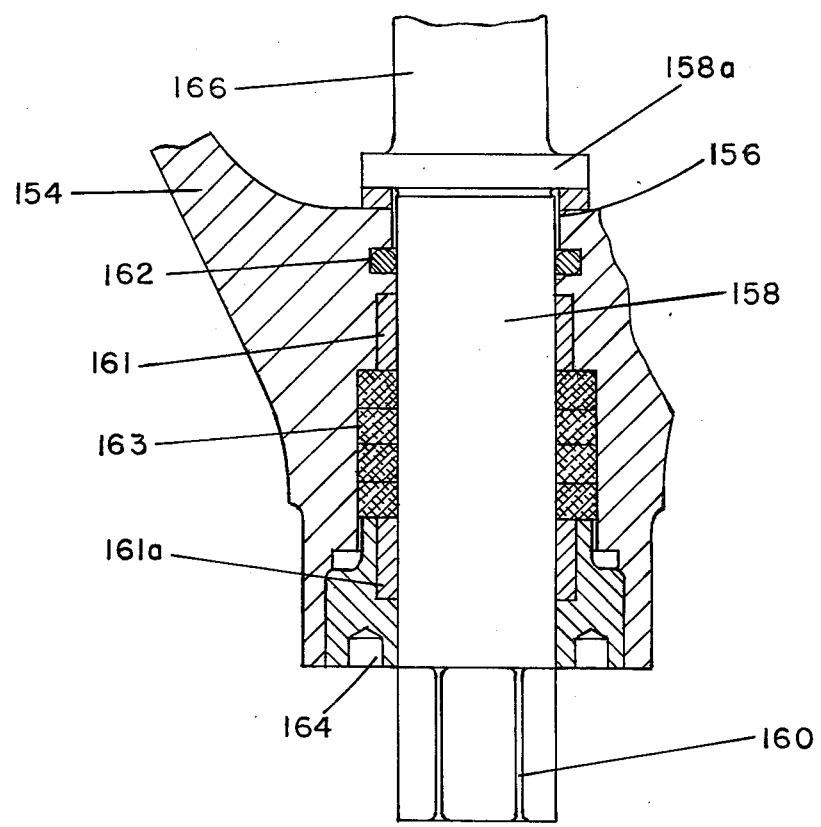
FIG. 5 is a sectional view looking in the direction of the arrows along the line 5—5 in FIG. 4, with the cap of the operator removed.

Adapter 120 also includes a valve operator assembly 150. The adapter body 132 includes a generally cylindrical tapered portion 133 which is tapered inwardly except in the area where spout 136 extends outwardly. Tapered portion 133 terminates in an adapter operator body portion 154. As shown best in FIG. 5, a bore 156 is provided in body portion 154. A valve operator 158 is provided in bore 156. Operator 158 includes a tool connection portion 160 having a square cross section adapted to receive a suitable tool for loading and unloading the outlet.

A pair of operator insert guides 161 and 161a, an o-ring seal 162 and a packing 163 are provided in bore 156 engaging operator 158. An adjusting screw 164 is provided to maintain packing 163, and guides 161 and 161a in place. Operator 158 also includes an upper extension portion 166 which may be circular in cross section. However, extension portion 166 includes an operator engagement portion 168 (FIG. 4) of square cross section of suitable size to engage the square cross section of connecting portion 43 of operator 42. A retainer 167 engaging a shoulder 158a on operator 158 held in place with a fastener 169, holds operator 158 against vertical movement.

A removable cap 170 is provided to cover valve operator portion 150. Cap 170 engages a depending portion 155 of adapter body portion 154. Cap 170 includes arms 172 having cam locking contoures 174 which are movable to an overcenter position engaging a concave contour 157 of adapter depending portion 155.

When the cap 170 is removed a suitable operating tool 180 is attached for rotation of operator 158 and operator 42 for opening and closing the valve closure 57. Tool 180 includes a circumferential body portion 182 having arms or ribs 184 which extend inwardly and upwardly to define an engagement portion 185 having a square cross section which engages the square cross section of operator tool connection portion 160. A suitable handle 186 is provided for manual rotation. If desired automatic rotative power may be connected to tool 180 to load or unload the lading.

In operation of the valve guard assembly of the present invention it will be assumed that the tank car arrives at the unloading site with lading to be unloaded. The car arrives with the valve guard assembly 70 in place as illustrated in FIG. 2, with cap 100 fastened in place within opening 98 and plug 110 in place within opening 114. To unload the lading plug 110 is first unloosened by attaching a tool to portion 117, to determine if lading has leaked in transit. It is unusual for significant leakage to occur, but if this is the case, receptacle 119 is obtained to collect the lading as plug 110 is completely removed. If little, or no leakage has occurred, plug 110 is removed and cap 100 is removed by appropriate rotation of bar through slots 116 to disconnect cap threads 112 from valve guard threads 115.

Adapter 120 is then inserted over valve guard depending portion 92 in a direction convenient to attach an unloading hose to spout 136, and locking member 126 are moved into the overcenter position shown in FIG. 4. Arms 128 are placed within resilient tube 131. Cap 140 is then removed from spout 136 by moving arms 144 out of the overcenter position, and an unloading hose with a guide connect fitting is attached to concave contour 138. Cap 170 is then removed and a suitable unloading tool 180 is attached to tool connection portion 140. Rotation of tool 180 will then rotate upper operator 42a, raise valve closure 57a and unload the lading through spout 136 and the unloading hose. Vacuum, pressure or gravity unloading may be utilized. After the tank has been unloaded it may be desirable to apply a suitable cleaning fluid. This may be done by replacing the unloading hose with a conduit to apply cleaning fluid into the tank. The cleaning conduit is then attached to concave contour 138.

To load the tank, a lading loading conduit is attached to concave portion 138. If not already in the open position valve closure 57a is moved to the open position by means of a tool 180. The car is then filled with lading by means of a suitable pressure system or vacuum suction system (not shown). After the tank has been filled, tool 180 is used to rotate operators 138 and 42a to move the valve closure 57a into the closed position shown in solid lines in FIG. 4. Tool 180 is then removed from portion 140 and cap 170 is put in place. The loading conduit is disconnected from concave portion 138 and cap 140 is applied in place over concave portion 138, and arms 144 are moved into the overcenter locked position. Then arms 138 are removed from tubular resilient member 131 and are moved out of the overcenter position. Adapter 120 may then be lowered out of engagement with valve guard depending portion 92. Valve guard cap 100 is then threadably inserted within depending portion 92 and valve plug 110 put in place within opening 114. The car is then ready for transport to the next destination.

In the unlikely event that the valve guard assembly would be impacted, as discussed above, the impact forces are applied to valve guard 72, valve body 78, universal flange 82 and into the tank body 14. Horisontal components of the impact force may cause the valve guard assembly to shear off along shear plane 77 in fasteners 76. However, operator 42a is protected against impacts in transit by valve guard assembly 70. Also valve guard plug 110 and cooperating threads 112 and 115 are protected by depending protrusion 104. Thus in an emergency, it is unlikely that plug 110 could not be removed quickly to unload the lading.

Since the adapter 120 does not have to withstand the abuse of in-transit travel, it can be made of lighter material such as aluminum and made smaller. It is easier for the operator to handle, in contrast to a heavy steel casting. Furthermore, the receiver need only have a relatively few adapters 120 to attach to the number of tanks to be simultaneously unloaded. Each tank car does not have to have a housing as is the case in U.S. Pat. No. 3,981,481. A more economical and lighter bottom operable tank car valve assembly is acheived with the valve guard assembly of the present invention.

What is claimed is:

1. A bottom operable tank car loading and unloading valve assembly including a valve body attached to an opening in the bottom of the tank having a valve body opening; a valve closure movable between a closed position closing said valve body opening, and an open position allowing lading to flow in or out of the tank; an operating stem depending from said valve closure; a valve closure operator spaced from the walls of the valve body, engaging said depending operating stem; said closure operator including a lower connection portion adapted to be engaged by a bottom operated connector; a retainer including means for engaging said valve body and at least one retainer rib extending radially inwardly and terminating in a generally circular hub; said hub slidingly engaging said valve closure operator to maintain the same spaced from the walls of said valve body and vertically fixed but rotatable; a valve guard assembly including a valve guard attached to said valve body with fastening means defining a shear plane, said valve closure connection portion being located above said shear plane, said valve guard being hollow and extending entirely below said connection portion; said valve guard having a transverse portion extending below and vertically spaced from said valve closure connection portion, the space between said transverse portion and said closure connection portion being unobstructed, said transverse portion including a removable cap; said assembly including a depending protrusion which extends below said transverse portion; said cap further including a cap opening located radially inwardly and above said protrusion; a plug removably mounted in said cap opening, whereby said protrusion protects said plug from impact forces applied to said protrusion whereby said plug can be quickly removed to check for lading leakage and/or unload the lading in an emergency situation, and whereby impact forces applied to said depending protrusion are transmitted vertically into said valve guard and into said valve body and/or said shear plane, and whereby said valve closure operator, said depending operating stem, and said valve closure, are substantially prevented from receiving said impact forces.

2. A bottom operable tank car valve assembly according to claim 1 wherein said plug is located above said protrusion.

3. A bottom operable tank car valve assembly according to claim 1 wherein said valve guard includes a contour for attaching a loading and unloading adapter.

4. A bottom operable tank car valve assembly according to claim 1 wherein said plug includes plug threads and said cap includes cap threads which engage said plug threads in closed position.

5. A bottom operable tank car valve assembly according to claim 1 wherein the said cap opening is of a size sufficient for a tool to pass therethrough and engage said operator, and provide clearance between the tool and the walls of the cap opening sufficient to unload the lading through the cap opening with the tool located within the cap opening.

6. A bottom operable tank car valve assembly according to claim 1 wherein said valve body is attached to a universal flange which is welded to the tank body.

7. An improved valve guard assembly according to claim 1 wherein said protrusion is located on said removable cap.

* * * * *